US012498112B1

(12) United States Patent
Li et al.

(10) Patent No.: US 12,498,112 B1
(45) Date of Patent: Dec. 16, 2025

(54) LED LIGHT STRING FOR DECORATION

(71) Applicant: Long Yan De Yu Lighting Co., Ltd., Fujian (CN)

(72) Inventors: Yuanming Li, Fujian (CN); Dehua Huang, Fujian (CN); Xiaoqin Jian, Fujian (CN); Zhansheng Jian, Fujian (CN)

(73) Assignee: LONG YAN DE YU LIGHTING CO., LTD., Fujian (CN)

( * ) Notice: Subject to any disclaimer, the term of this patent is extended or adjusted under 35 U.S.C. 154(b) by 0 days.

(21) Appl. No.: 19/026,231

(22) Filed: Jan. 16, 2025

(30) Foreign Application Priority Data

Nov. 28, 2024 (CN) ......................... 202422919439.6

(51) Int. Cl.
*F21V 23/06* (2006.01)
*F21S 4/10* (2016.01)
*F21V 15/01* (2006.01)
*F21V 23/00* (2015.01)
*F21V 33/00* (2006.01)
*F21Y 115/10* (2016.01)

(52) U.S. Cl.
CPC ................ *F21V 23/06* (2013.01); *F21S 4/10* (2016.01); *F21V 15/01* (2013.01); *F21V 23/001* (2013.01); *F21V 23/009* (2013.01); *F21V 33/0052* (2013.01); *F21Y 2115/10* (2016.08)

(58) Field of Classification Search
CPC ............. F21Y 2115/10; F21V 33/0052; F21V 23/009; F21V 23/001; F21V 23/06; F21V 15/01; F21S 4/10
See application file for complete search history.

(56) References Cited

U.S. PATENT DOCUMENTS

2016/0057829 A1* 2/2016 Li .......................... F21K 9/232 315/313

FOREIGN PATENT DOCUMENTS

CN 204664937 U * 9/2015
CN 114017705 A * 2/2022 .......... F21V 23/0435

* cited by examiner

*Primary Examiner* — Anabel Ton
(74) *Attorney, Agent, or Firm* — Leong C. Lei

(57) ABSTRACT

An LED light string includes a power cord and a plurality of LED lights connected in series and parallel on the power cord. The LED lights each include a light socket, a housing, and a built-in light source. The built-in light source includes a chip board, an access portion, and a light-emitting portion. The chip board is a transparent or semitransparent chip board and has a geometric shape. A portion of the chip board, corresponding to the light-emitting portion, is provided with a conductive line. Light-emitting chips of different colors are disposed on the conductive line to form the light-emitting portion. The light-emitting portion is located in the housing. The access portion is fixed to the light socket and has a negative access terminal and a positive access terminal. The negative access terminal and the positive access terminal are electrically connected to the power cord and the conductive line.

9 Claims, 5 Drawing Sheets

LED LIGHT STRING FOR DECORATION

BACKGROUND OF THE INVENTION

1. Field of the Invention

The present invention relates to LED lights, and more particularly to an LED light string for decoration.

2. Description of the Prior Art

As a combination of lighting and decoration, LED light strings possess strong decorative features and are widely used in various scene arrangements. However, most of existing LED light strings are connected using one or more built-in filaments, which results in relatively limited color variation and no design shapes. This makes it difficult to create unique atmospheric scenes and fails to meet consumers' demands for personalized scene arrangements.

Some existing LED lights have shaped filaments. However, most of them require built-in power supply and control components and can only be used as independent lights. When used for scene arrangements, they need to be installed individually, which is cumbersome and makes it difficult to achieve the integrity and continuity of phantom colors, jumping, news ticker and other functions across the entire scene.

SUMMARY OF THE INVENTION

In view of the deficiencies of the prior art, the primary object of the present invention is to provide an LED light string for decoration.

The present invention is realized through the following technical solutions:

According to one aspect of the present invention, an LED light string comprises a power cord and a plurality of LED lights connected in series and parallel on the power cord. The power cord is connected to an external power supply. The LED lights each include a light socket, a housing, and a built-in light source. The built-in light source includes a chip board, an access portion, and a light-emitting portion. The access portion and the light-emitting portion are disposed on the chip board. The chip board is a transparent or semitransparent chip board. One or two sides of the chip board is coated with encapsulating glue. The chip board has a geometric shape. A portion of the chip board, corresponding to the light-emitting portion, is provided with a conductive line. Light-emitting chips of different colors are disposed on the conductive line to form the light-emitting portion. The light-emitting portion is located in the housing. An upper end of the access portion is fixed to the light socket. A lower end of the access portion is connected to the light-emitting portion. A negative access terminal and a positive access terminal are provided on the access portion. The negative access terminal and the positive access terminal are electrically connected to the power cord and the conductive line.

Based on the foregoing, by setting LED lights with built-in light sources in different shapes on the LED light strings, users can select or customize personalized lights according to their own needs or decorate the scene with LED light strings that match the theme or surrounding environment, providing a more comfortable experience and simplifying the arrangement work.

Furthermore, the access portion has a first resistor. One end of the first resistor is electrically connected to the positive access terminal or the negative access terminal. Another end of the first resistor is electrically connected to the conductive line. This design make the voltage supplied to the light-emitting portion more stable, which is beneficial for prolonging the service life of the light-emitting chips.

Furthermore, the access portion further has a control chip. The control chip is electrically connected to the conductive line, the first resistor, and one of the negative access terminal and the positive access terminal. The control chip is configured for controlling a corresponding one of the LED lights to achieve a dynamic display. This design facilitates each LED light to independently achieve a dynamic display effect such as gradual lighting, gradual dimming, flashing, color-changing and segmented lighting according to the built-in program.

Preferably, the external power supply is a high-voltage DC power supply. An access terminal is provided on the access portion. A bridge rectifier circuit is provided on the LED light string. The bridge rectifier circuit is configured for converting high-voltage alternating current to low-voltage direct current. This design facilitates direct connection of the LED light string to alternating current without providing additional low-voltage DC power supply, further simplifying the arrangement work.

Furthermore, the LED lights or the LED light string is connected in series with the bridge rectifier circuit. The bridge rectifier circuit includes a second resistor and two parallel wires connected in series with the second resistor. The parallel wires are equipped with diodes at two ends of the LED lights or the LED light string. The diodes on the two parallel wires are arranged in opposite directions.

Furthermore, the bridge rectifier circuit is disposed on the access portion of the built-in light source of each of the LED lights. The access portion has a first resistor. The bridge rectifier circuit is electrically connected to the conductive line, the first resistor and the access terminal. This design can realize the series connection of LED lights with different voltages by adjusting the resistance value of the second resistor, which is beneficial for increasing the selectivity of the light string.

According to another aspect of the present invention, an LED light string comprises a power cord and a plurality of LED lights connected in series and parallel on the power cord. The power cord is connected to an external power supply. The LED lights each include a light socket, a housing, and a built-in light source. The built-in light source is a small transparent or semitransparent LED display. The LED display is disposed in the housing. An upper end of the LED display is fixed to the light socket. By placing the small LED display in the LED light, on the basis of realizing a dynamic display effect such as gradual lighting, gradual dimming, flashing, color-changing and segmented lighting, the LED light string can display text, full-color animation, date, time and other animation effects, making the LED light string more attractive.

Furthermore, based on the foregoing solutions, a master controller is provided on an input end of the power cord for controlling each of the LED lights to achieve a dynamic display in a unified manner or to superimpose the dynamic display effect of each LED light to present a richer lighting effect.

Furthermore, based on the foregoing solutions, two ends of the power cord have an input plug and an output plug. The input plug and the output plug are male and female plugs. The design can make shorter light strings and is conducive to connecting multiple light strings to extend the length of the light strings for decoration.

With the above technical solutions, the present invention has the following advantages or beneficial effects:

1. LED lights with built-in light sources in different shapes are connected in series and parallel to form a light string and uniformly powered by a power cord, which reduces the production cost and installation difficulty, meets the personalized needs of customers or scene arrangement, integrates with the surrounding environment and atmosphere, and has great convenience of use and decoration.
2. By setting a controller on individual LED lights and/or the circuit of the LED light string, the LED light string can achieve rich and diverse dynamic display effects uniformly and/or independently, further improving the phantom color, news ticker, flashing, and personalized display functions of the LED light string, making it more decorative.
3. By providing a bridge rectifier circuit on the LED light string or LED light, the LED light string can be directly connected to the utility power, solving the problem that the LED light string must be equipped with a low-voltage DC power supply and further improving the convenience of installation.
4. By providing a transparent or semitransparent small LED display as the built-in light source of the LED light, the LED light string has a better animation demonstration effect and can be viewed in any direction, making it more personalized and more decorative.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION OF THE PREFERRED EMBODIMENTS

Embodiments of the present invention will now be described, by way of example only, with reference to the accompanying drawings.

First Embodiment

Figure 1:
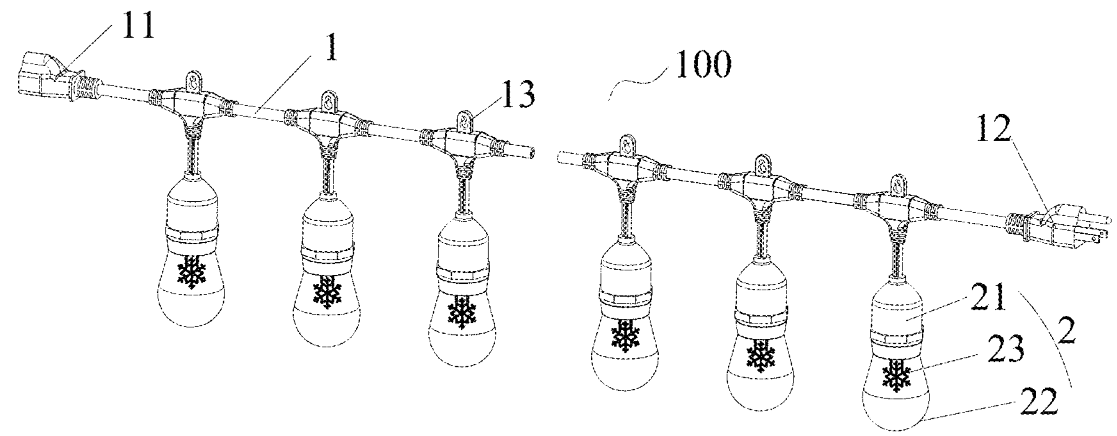
FIG. 1 is a schematic view of a first embodiment of the present invention.

As shown in FIG. 1, the present invention provides an LED light string 100 for decoration, comprising a power cord 1 and a plurality of LED lights 2 connected in series and parallel on the power cord 1. The power cord 1 is connected to an external power supply. In this embodiment, a low-voltage DC power supply 200 is used as the external power supply. The LED light 2 includes a light socket 21, a housing 22, and a built-in light source 23. Two ends of the power cord 1 have an input plug 11 and an output plug 12 that are male and female plugs, so as to extend the length of the LED light string. The light sockets 21 of the LED lights 2 are disposed on the power cord 1 at equal intervals. A hanging hole 13 is disposed above the socket 21. The housing 22 is made of transparent or translucent material.

Figure 2:
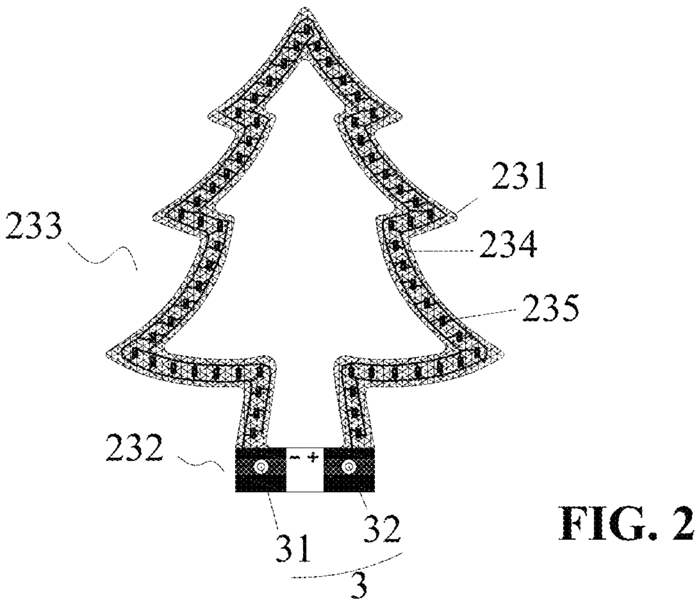
FIG. 2 is a first schematic view of the built-in light source of the first embodiment of the present invention.

As shown in FIG. 2, the built-in light source 23 includes a chip board 231, an access portion 232, and a light-emitting portion 233. The access portion 232 and the light-emitting portion 233 are disposed on the chip board 231. The chip board 231 is a transparent or semitransparent chip board, which may be made of sapphire, ceramic, glass or other materials, or may be made of polyimide materials with higher flexibility and transparency. One or two sides of the chip board 231 are coated with encapsulating glue (not shown in the drawings). The encapsulating glue may be transparent glue or fluorescent glue. The chip board 231 may be designed in any geometric shape, such as a preset shape (as shown in FIG. 1 and FIG. 2) or a customized shape.

Figure 3:
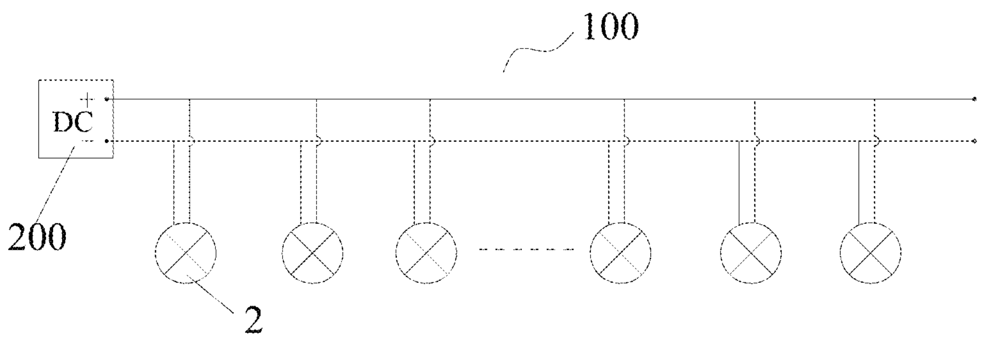
FIG. 3 is a schematic view of the circuit of the first embodiment of the present invention.

The portion of the chip board 231, corresponding to the light-emitting portion 233, is printed or etched with a conductive line 234. Light-emitting chips 235 of different colors are disposed on the conductive line 234. The light-emitting chip 235 may be a wire-bonded chip or a flip-chip, and is fixed on the chip board 231 through die-bonding glue, solder paste or eutectic bonding. The light-emitting chips 235 are arranged in the shape of the chip board 231 to form the light-emitting portion 233. The light-emitting portion 233 is located in the housing 22. The upper end of the access portion 232 is fixed to the light socket 21, and the lower end of the access portion 232 is connected to the light-emitting portion 233, referring to FIG. 1. An access terminal 3 is provided on the access portion 232. The access terminal 3 includes a negative access terminal 31 and a positive access terminal 32. The negative access terminal 31 and the positive access terminal 32 are electrically connected to the power cord 1 and the conductive line 234 to form a complete power supply circuit, referring to FIG. 3.

Figure 4:
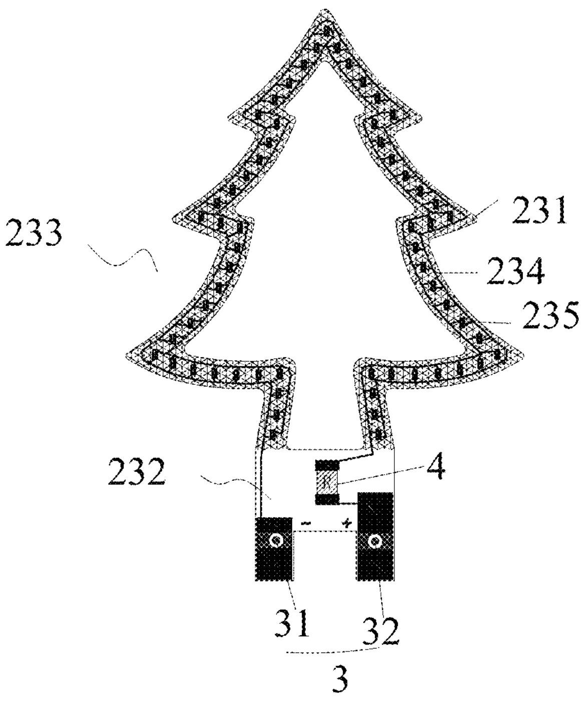
FIG. 4 is a second schematic view of the built-in light source of the first embodiment of the present invention.

In one embodiment, as shown in FIG. 4, the access portion 232 of each LED light 2 has a first resistor 4. One end of the first resistor 4 is electrically connected to the positive access terminal 32 or the negative access terminal 31, and the other end of the first resistor 4 is electrically connected to the conductive line 234, so as to make the voltage supplied to the light-emitting section 233 more stable. This is beneficial for protecting the light-emitting chips 235.

In this embodiment, the LED lights 2 with built-in light sources in different shapes are formed into a light string and are uniformly powered by the power cord 1, which reduces the production cost and installation difficulty, meets the personalized needs of customers or scene arrangement, integrates with the surrounding environment and atmosphere, and has great convenience of use and decoration.

Second Embodiment

Figure 5:
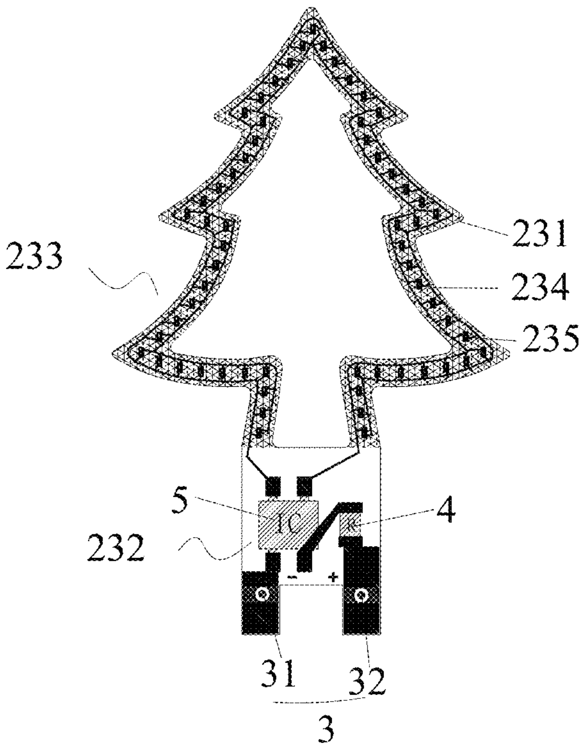
FIG. 5 is a schematic view of the built-in light source of a second embodiment of the present invention.

This embodiment provides an LED light string 100 based on the structure of the first embodiment. As shown in FIG. 5, the access portion 232 of each LED light 2 further has a control chip 5. The control chip 5 is electrically connected to the conductive line 234, the first resistor 4, and one of the negative access terminal 31 and the positive access terminal 32. The control chip 5 is configured for controlling the corresponding LED light 2 to independently achieve a dynamic display effect such as gradual lighting, gradual dimming, flashing, color-changing, and segmented lighting, so as to facilitate personalized and colorful arrangements.

Third Embodiment

This embodiment provides an LED light string 100, which is substantially similar to the foregoing embodiments with the exceptions described hereinafter.

A master controller 6 is provided on the input end of the power cord 1 for controlling each LED light 2 to achieve a dynamic display effect in a unified manner.

Figure 6:
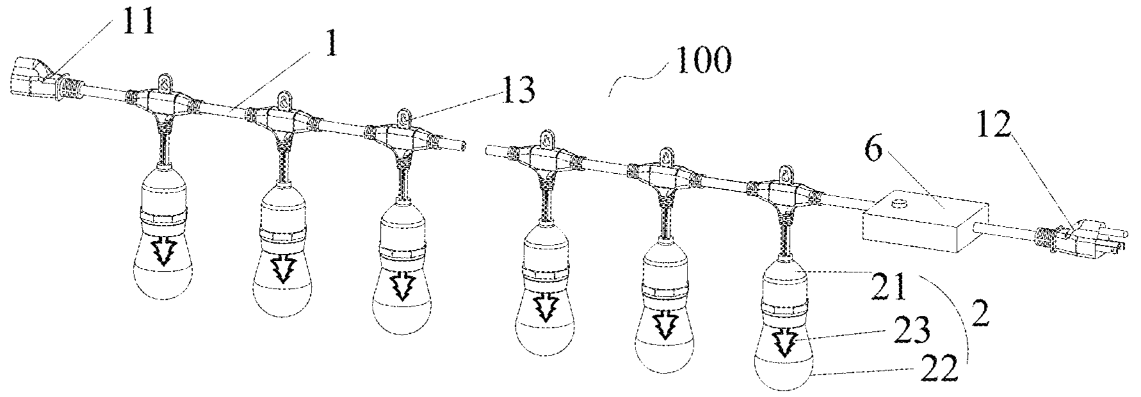
FIG. 6 is a schematic view of a third embodiment of the present invention.
Figure 7:
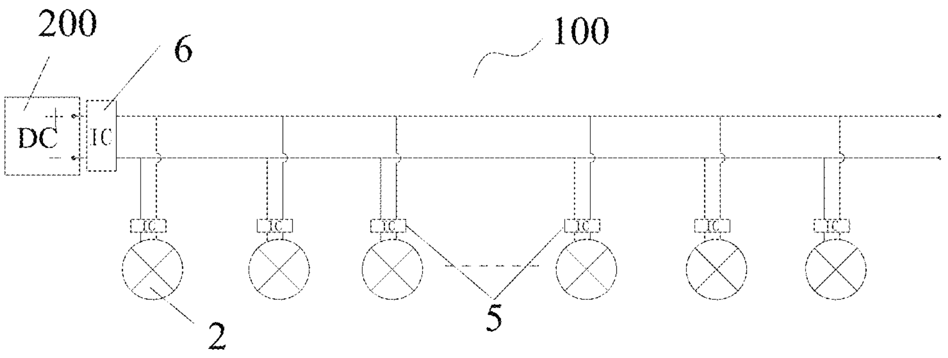
FIG. 7 is a schematic view of the circuit of the third embodiment of the present invention.

Specifically, as shown in FIG. 6, the master controller 6 is added based on the structure of the first embodiment, so that the LED light string 100 can achieve a dynamic display effect in a unified manner, such as gradual lighting, gradual dimming, flashing, color-changing, and segmented lighting according to the overall program after being powered. Alternatively, as shown in FIG. 7, the master controller 6 is added based on the structure of the second embodiment, so that the LED light string 100 can flexibly achieve a dynamic display effect in a unified or independent manner, such as gradual lighting, gradual dimming, flashing, color-changing, and segmented lighting after being powered.

Fourth Embodiment

This embodiment provides an LED light string 100, which is substantially similar to the foregoing embodiments with the exceptions described hereinafter.

Figure 8:
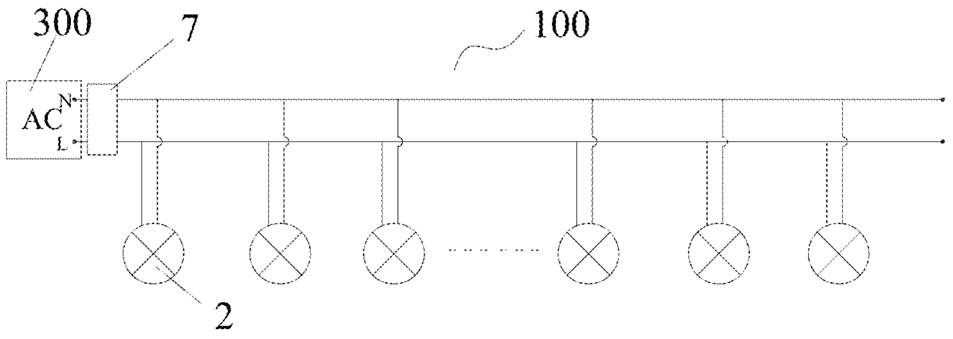
FIG. 8 is a schematic view of the circuit of a fourth embodiment of the present invention.
Figure 9:
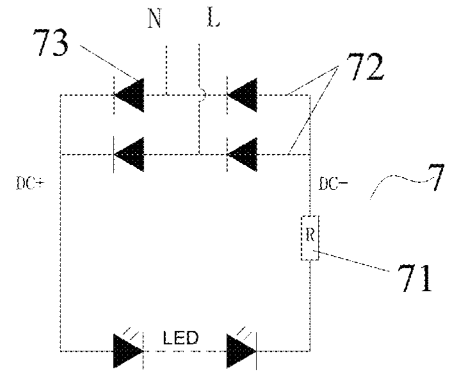
FIG. 9 is a schematic view of the bridge rectifier circuit of the fourth embodiment of the present invention.

As shown in FIG. 8, a high-voltage DC power supply 300 is used as the external power supply. A bridge rectifier circuit 7 is provided on the LED light string 100. The bridge rectifier circuit 7 is configured for converting high-voltage alternating current to low-voltage direct current, so that the LED light string 100 can be directly connected to the alternating current for use without the need to provide an additional power supply. As shown in FIG. 9, the bridge rectifier circuit 7 includes a second resistor 71 and two parallel wires 72 connected in series with the second resistor 71. The parallel wires 72 are equipped with diodes 73 at both ends of the LED lights 2 or the LED light string 100. The diodes 73 on the two parallel wires 72 are arranged in opposite directions.

Figure 10:
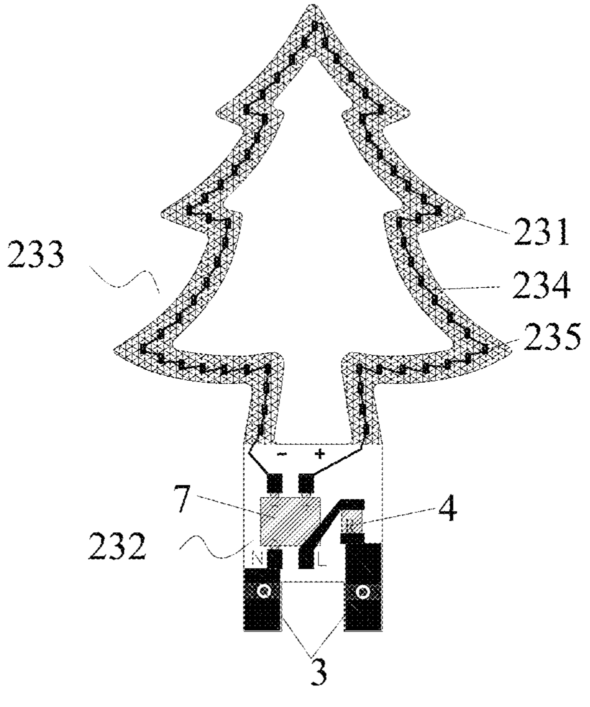
FIG. 10 is a schematic view of the built-in light source of the fourth embodiment of the present invention.

Specifically, as shown in FIG. 8, the bridge rectifier circuit 7 is connected in series with the entire LED light string 100, that is, the bridge rectifier circuit 7 first converts input high-voltage alternating current to low-voltage direct current, and then supplies power to the entire LED light string 100. Alternatively, as shown in FIG. 10, the bridge rectifier circuit 7 is disposed on the access portion 232 of each built-in light source 23. The access portion 232 has the first resistor 4. The bridge rectifier circuit 7 is electrically connected to the conductive line 234, the first resistor 4, and the access terminal 3. By adjusting the resistance of the second resistor 71 of the bridge rectifier circuit 7 to produce the LED lights 2 with different voltages, the LED lights 2 with different voltages are connected in series, thereby increasing the selectivity and colorfulness of the LED light string.

Fifth Embodiment

This embodiment provides an LED light string 100, which is substantially similar to the first or fourth embodiment with the exceptions described hereinafter.

Figure 11:
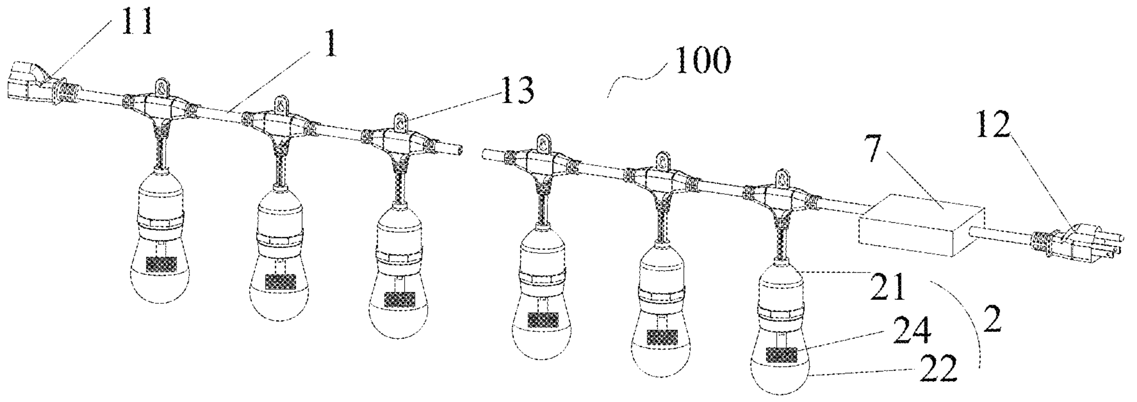
FIG. 11 is a schematic view of a fifth embodiment of the present invention.

Based on the structure of the first or fourth embodiment, as shown in FIG. 11, the built-in light source 23 is replaced with a transparent or semitransparent small LED display 24. The LED display 24 is disposed in the housing 22. The upper end of the LED display 24 is fixed to the light socket 21.

The advantage of this embodiment is that by placing the small LED display 24, on the basis of realizing a dynamic display effect such as gradual lighting, gradual dimming, flashing, color-changing, and segmented lighting, the LED light string can display text, full-color animation, date, time and other animation effects, making the LED light string more attractive.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An LED (light-emitting diode) light string, comprising a power cord and a plurality of LED lights connected in series and parallel on the power cord, the power cord being connected to an external power supply, the LED lights each including a light socket, a housing and a built-in light source, the built-in light source including a chip board, an access portion and a light-emitting portion, the access portion and the light-emitting portion being disposed on the chip board, the chip board being a transparent or semitransparent chip board, one or two sides of the chip board being coated with encapsulating glue, the chip board having a geometric shape, a portion of the chip board, corresponding to the light-emitting portion, being provided with a conductive line, light-emitting chips of different colors being disposed on the conductive line to form the light-emitting portion, the light-emitting portion being located in the housing, an upper end of the access portion being fixed to the light socket, a lower end of the access portion being connected to the light-emitting portion, a negative access terminal and a positive access terminal being provided on the access portion, the negative access terminal and the positive access terminal being electrically connected to the power cord and the conductive line.

2. The LED light string as claimed in claim 1, wherein the access portion has a first resistor, one end of the first resistor is electrically connected to the positive access terminal or the negative access terminal, and another end of the first resistor is electrically connected to the conductive line.

3. The LED light string as claimed in claim 2, wherein the access portion further has a control chip, the control chip is electrically connected to the conductive line, the first resistor, and one of the negative access terminal and the positive access terminal, and the control chip is configured for controlling a corresponding one of the LED lights to achieve a dynamic display.

4. The LED light string as claimed in claim 1, wherein a master controller is provided on an input end of the power cord for controlling each of the LED lights to achieve a dynamic display in a unified manner.

5. The LED light string as claimed in claim 3, wherein a master controller is provided on an input end of the power cord for controlling each of the LED lights to achieve the dynamic display in a unified manner.

6. The LED light string as claimed in claim 1, wherein the external power supply is a high-voltage DC power supply, a bridge rectifier circuit is provided on the LED light string, and the bridge rectifier circuit is configured for converting high-voltage alternating current to low-voltage direct current.

7. The LED light string as claimed in claim 6, wherein the LED lights or the LED light string is connected in series with the bridge rectifier circuit, the bridge rectifier circuit includes a second resistor and two parallel wires connected in series with the second resistor, the parallel wires are equipped with diodes at two ends of the LED lights or the LED light string, and the diodes on the two parallel wires are arranged in opposite directions.

8. The LED light string as claimed in claim 6, wherein the bridge rectifier circuit is disposed on the access portion of the built-in light source of each of the LED lights, the access portion has a first resistor, and the bridge rectifier circuit is electrically connected to the conductive line, the first resistor and an access terminal of the access portion.

9. The LED light string as claimed in claim 1, wherein two ends of the power cord have an input plug and an output plug, and the input plug and the output plug are male and female plugs.

* * * * *